Sept. 18, 1934.   A. GEORGIEV   1,973,852
ELECTRIC CONDENSER
Filed Nov. 22, 1930   2 Sheets-Sheet 1
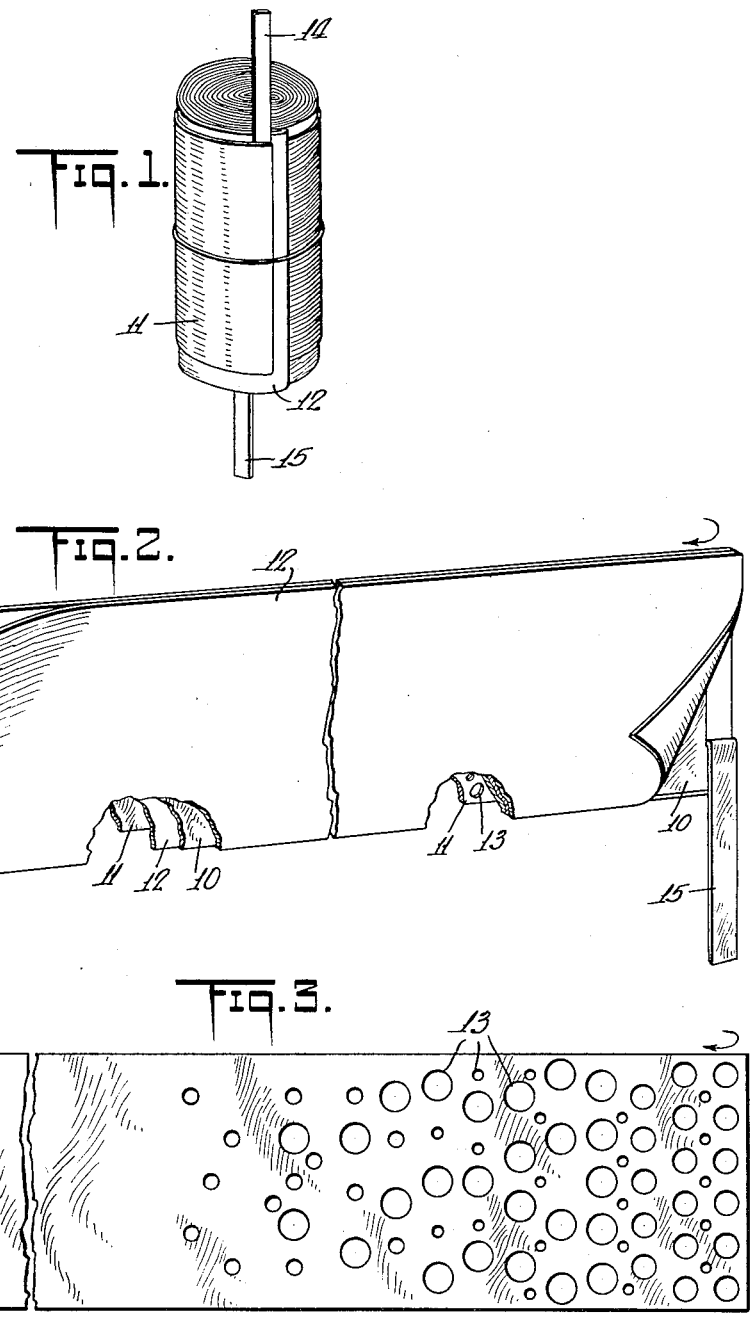
INVENTOR
*Alexander Georgiev*
BY
Dean, Fairbank, Hirsch & Foster
his ATTORNEYS

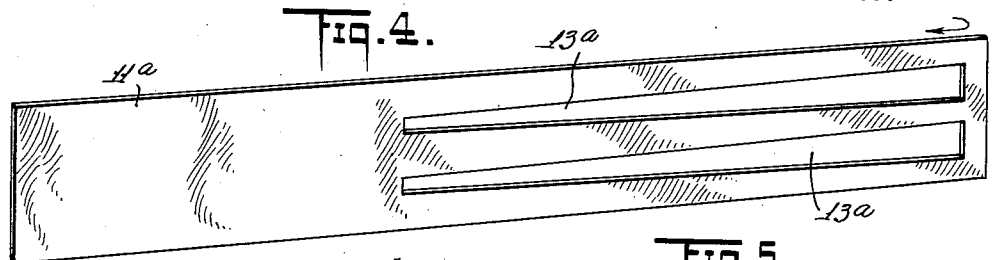
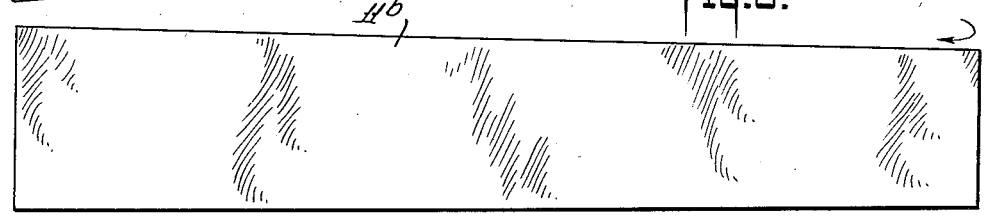
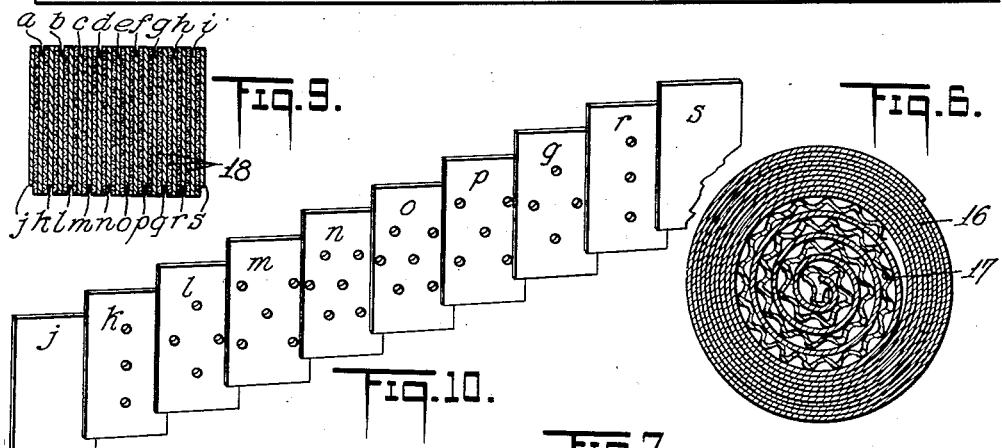
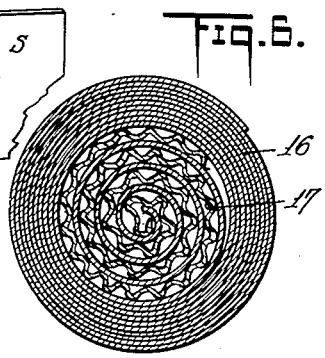
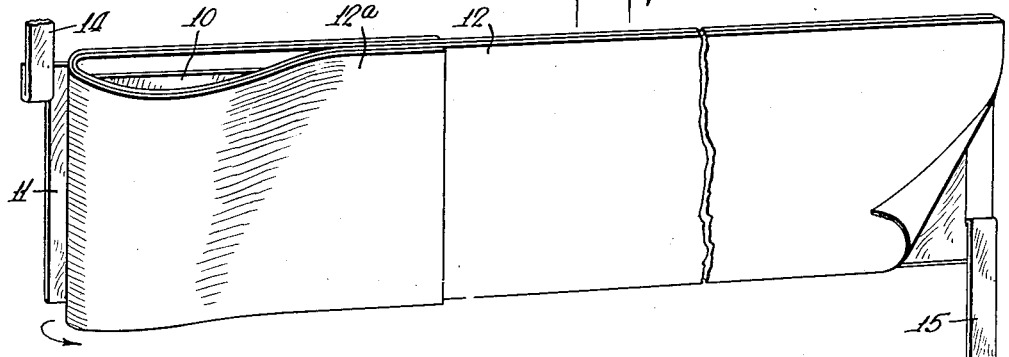
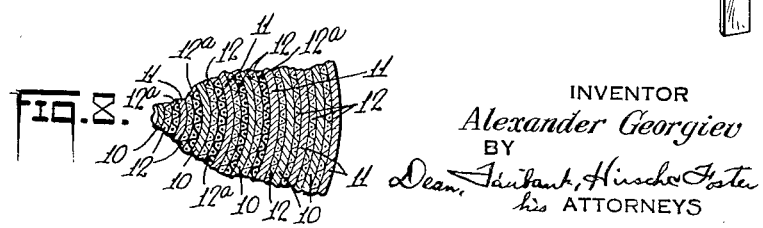

Patented Sept. 18, 1934

1,973,852

UNITED STATES PATENT OFFICE 1,973,852

ELECTRIC CONDENSER

Alexander Georgiev, Brooklyn, N. Y., assignor to Aerovox Corporation, a corporation of New York Application November 22, 1930, Serial No. 497,385

14 Claims. (Cl. 175—315)

My present invention is concerned with improvements in condensers of the electrolytic type, that is, the type in which the di-electric is formed as a thin film upon the surface of the anode by electro-chemical action.

As conducive to a clear understanding of the invention, it is noted that due to the heat insulating effect of the outer parts of an electrolytic condenser, and particularly of the outer convolutions of a condenser roll, free radiation and conduction of heat from the interior of the condenser is, in general, hindered, with consequent cumulative increase of heat generating leakage current in this region, and it is an object of the invention to reduce such excess interior leakage.

Another object is to accomplish the foregoing result in a simple and effective manner, without materially increasing the internal resistance of the condenser or materially affecting its capacitance and without resorting to alterations in the desirable characteristics of the electrolyte solution which is commonly employed.

A typical wound electrolytic condenser constructed in accordance with my copending application, Serial No. 489,521, filed October 18th, 1930, consists of conductive anode and cathode strips wound with an electrolyte impregnated fabric between them, the passage of current through the electrolyte serving initially to form a thin di-electric film upon the anode plate. With this type of condenser, assuming that the di-electric film has a fixed resistivity and the spacing of the plates is unaltered, the magnitude of the leakage currents for a given voltage is governed by the resistance of the electrolyte medium and by the characteristics of the electrode foil or plates.

In accordance with the present invention, increase in the resistivity of the electrolyte solution is preferably avoided, since this might eventually adversely affect some of the desirable properties of the solution and would increase the internal resistance of the condenser as a whole only in the inner region. The desired reduction of the leakage current is effected by purely mechanical means, broadly by reducing or preventing excess heating at the interior of the condenser, and more specifically by increasing the resistance to leakage currents at the interior and thereby reducing leakage currents.

One simple manner of accomplishing the desired result is so to perforate the cathode plate or foil that the effective conductive surface of metal on the cathode plate per unit of plate area progressively increases from the inner toward the outer end thereof and the plate area from which leakage currents might pass is thus substantially reduced at the center of the condenser with consequent increase of resistance to the flow of leakage current, and minimizing of the heating effect.

It is within the spirit of the invention, however, to utilize various other means for accomplishing this result, such for instance, as tapering the cathode plate from its outer toward its inner end, or slotting the plate or providing an increased thickness of electrolyte impregnated gauze adjacent the plate center, all of such arrangements tending to increase the resistance of the flow path for leakage currents near the center of the roll.

It is also within the spirit of the invention to facilitate heat dissipation at the center of the roll rather than preventing or minimizing heat generation in this region. To permit rapid dissipation of heat from the inner convolutions of the roll, they may be slightly spaced apart as by a corrugated paper spacer or the like.

It will, of course, be understood that alterations in the conformation of the cathode plate have no marked direct effect upon the capacitance of the condenser since the cathode plate serves merely as a conductor to carry the current from the electrolyte solution and the solution itself is the actual cathode of the condenser.

While, as suggested above, the invention is broadly applicable to various styles of wound electrolytic condensers, it is also of utility in stack condensers, and while it finds its preferred embodiment in an essentially dry electrolytic condenser, the perforated cathode plate operates well in such wet electrolytic condensers in which the regulation of the internal resistance and the promotion of electrolyte circulation are desirable.

The invention may be more fully understood from the following description in connection with the accompanying drawings, wherein Fig. 1 is a perspective view of a wound condenser embodying the invention, Fig. 2 is a perspective view of the condenser just prior to winding and with the gauze broken away to disclose the perforations in the cathode plate, Fig. 3 is a fragmentary view of the cathode plate, Fig. 4 is a perspective view of a modified type of cathode plate, Fig. 5 is a plan view showing a further modified form of plate, Fig. 6 is a diagrammatic transverse sectional view through a condenser in which the inner convolutions are spaced apart to permit free air circulation and rapid heat dissipation, Fig. 7 is a view similar to Fig. 2 but illustrating a further modification in which an extra thickness of electrolyte impregnated fabric is employed at the center of the roll, Fig. 8 is a sector sectional view of the condenser according to the embodiment of Fig. 7, Fig. 9 is a sectional view of a stack condenser embodying my invention, and Fig. 10 is a developed view showing the cathode plates of Fig. 9.

Referring first to Figs. 1 to 3 of the drawings, the reference numeral 10 designates the anode plate of the condenser. The cathode plate is shown at 11 and a sheet of fabric, such for instance, as the gauze 12 impregnated with a suitable electrolytic solution is interposed between these plates and preferably doubled back upon itself to completely surround the anode plate. The plates 10 and 11 are provided with suitable terminal tongues 14 and 15 adapted to project from the ends of the roll or pack when the superimposed strips and interposed fabric are wound into a compact roll as illustrated in Fig. 1.

Reference may be had to my copending application, Serial No. 489,521, filed October 18th, 1930, for a complete understanding of the method of impregnating the gauze with electrolyte and causing electro-chemical forming of a thin dielectric film upon the anode plate by the passage of current through the condenser.

Suffice it to say that when the condenser is formed, the cathode plate which serves primarily as an electrical conductor, being also of good heat conductive material will readily dissipate any heat which may be generated in the outer convolutions of the condenser by leakage currents passing directly from the anode to the cathode.

It will be readily seen that with a wound condenser, the heat generated at the center of the roll is not readily dissipated by radiation or by conduction, due to the long path which it must traverse to reach the air. It will also be apparent that when heat is generated at the center of the condenser, the resistivity of the electrolyte is reduced and the heating effect is cumulative, that is to say, the lowered resistivity of the electrolyte permits greater leakage which, in turn, causes greater heating.

The problem, therefore, in the present invention, is to relieve this overheating at the center of the condenser and in Figs. 2 and 3, I have shown one method of accomplishing the desired result. Here the cathode plate is provided with a plurality of perforations 13 which may be of any suitable size and shape and arranged in rows or staggered. These perforations are so arranged that for every square unit of its area, the cathode plate is least conductive at the center of the roll and progressively more conductive toward the outside of the roll, the outer ends of this plate being preferably imperforate in the region where they are in direct heat exchanging relationship with the air.

In Fig. 3 is shown an arrangement of the cathode plate perforations, which is purely illustrative, of a wide variety of arrangements within the scope of my invention. At the inner end of the condenser and across the width thereof, are shown two rows of six circular holes—¼ inch in diameter with an intervening row of five apertures, ⅛ inch in diameter. There follow two parallel rows of but five of the larger holes with an intervening row of five of the smaller ones, then as I proceed toward the outer part of the cathode, small holes replace some of the larger ones, alternating therewith until nearer the outer end of the roll, there are but scattering smaller holes—the outer part of the cathode being imperforate.

The effect of this method is to progressively minimize leakage currents toward the center of the roll and consequently effect a stabilization of leakage current until the film of the anode will provide the high insulation resistance desirable in normal operation of the condenser.

The reduced electrically effective conductive area of the cathode plate near the center of the roll affords, of course, a corresponding increase in resistance at the center with a corresponding minimizing of leakage and equalization of temperature throughout the roll. The electrolyte in the interlay, becoming more fluid as the condenser heats it has a tendency to circulate to a degree through the holes in the cathode plate, and thus tends to equalize the temperature throughout the condenser, and, moreover, contributes to a more uniform distribution of electrolyte along the entire area of the interlay.

Fig. 4 illustrates a modification in which the cathode plate 11a is provided with longitudinal slots 13a therein. Here again the outer end of the plate is preferably imperforate and, if desired, the slots may be of increasing width toward the inner end of the plate. The effect of these slots in any event, is to increase the resistivity of the condenser in the region where undesirable heat generation is apt to occur with consequent minimization of leakage currents and prevention of undue heating.

Fig. 5 illustrates another means for accomplishing a somewhat similar result. This figure shows a cathode plate 11b which decreases in width from its inner to its outer end. This form of the invention is not quite as effective as the form shown in Fig. 2 since, while the effective conductive area of the plate is reduced toward the center of the roll, the total conductive surface for each square unit of plate surface is not reduced.

Fig. 6 is a purely diagrammatic view, the various convolutions of the condenser (including anode and cathode plates and electrolyte impregnated gauze) being shown by a single cross-hatched thickness of material at 16. This figure illustrates a method of minimizing heating at the region of the center of the roll without alteration of the construction of the cathode plate. Here the central convolutions of the roll are spaced apart by corrugated paper 17 or equivalent material designed to facilitate circulation of convection currents of air and thereby promote rapid heat dissipation.

In Fig. 7, I effect the desired increased resistivity adjacent the center of the roll by the use of an extra thickness 12a of electrolyte impregnated gauze. Thus, without changing the character of the electrolytic solution, the amount of the solution between the positive and negative plates of the condenser is increased where desired, with a corresponding increase in resistance and a corresponding decrease in leakage currents and heating at the center of the roll.

In Figs. 9 and 10 the invention is shown applied to a stack condenser—the anodes of which are designated in Fig. 9 respectively as $a$, $b$, $c$, $d$, $e$, $f$, $g$, $h$, and $i$. The intervening and outer cathode plates are designated $j$, $k$, $l$, $m$, $n$, $o$, $p$, $q$, $r$ and $s$ in succession, and are shown developed in Fig. 10. There are preferably separator sheets 18 of gauze impregnated with electrolyte, interposed between consecutive electrode plates.

As appears from Fig. 10, cathode plates $n$ and $o$ have perforations near the central area thereof, illustratively seven in number, plates $m$ and $p$ have a lesser number, $l$ and $q$ a still lesser number, $k$ and $r$ a minimum number of perforations, and plates $j$ and $s$ which are at the exterior are imperforate. The perforations on all of the perforated cathode plates are near the central part of the area thereof, rather than near the border, where good radiation would occur.

Thus, the action is equivalent to that described above in connection with Figs. 1 to 3. At the middle of the condenser volume, where radiation is a minimum, and leakage of current due to consequent heating would be a maximum, the effective area of the cathode plates is most sharply reduced by a maximum number of perforations. In acordance with improvement in radiation and conduction, as we proceed nearer the exposed exterior of the condenser, the number of perforations is correspondingly less.

The principles of Figs. 4, 5, 6 and 7 respectively could be embodied in the stack construction of Figs. 9 and 10, but as the manner of execution of such application is obvious in view of the foregoing, to those skilled in the art, it will not be set forth at length.

It will thus be seen that there are herein described, apparatus and methods in which the several features of this invention are embodied, and which in service attain the various objects of the invention and are well suited to meet the requirements of practical use.

As many changes could be made in the above disclosure, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. An electrolytic condenser unit including correlated anode and cathode electrode elements, di-electric film therebetween and means to reduce the current carrying capacity of the electrolyte between the anode and cathodes at the inner part of the condenser unit, thereby to prevent excess heating thereat.

2. An electrolytic condenser unit including correlated anode and cathode electrode elements with an electrolyte medium therebetween, said anode means having a di-electric film thereon and means to reduce the current carrying capacity of the electrolyte medium between the foils at the inner part of the unit, thereby minimizing the otherwise excessive heat generated nearer the center of the condenser unit.

3. An electrolytic condenser unit having anode and cathode electrode elements with an electrolyte medium therebetween, said anode elements having a di-electric film thereon and means in the interior of the condenser unit to reduce the conductivity through the electrolyte medium thereat, said means being of progressively increasing effectiveness with maximum effectiveness at the center of the condenser.

4. An electrolytic condenser unit including anode and cathode electrode elements having interposed electrolyte medium and di-electric film and means at the inner part of the condenser increasing the electrical resistance thereat, thereby to reduce the excessive leakage currents otherwise occurring at said region.

5. An electrolytic condenser unit including anode and cathode electrode elements having interposed electrolyte medium and di-electric film, the cathode area near the central part of the condenser structure being reduced and progressively increasing toward the outer part of the condenser, thereby to compensate for excess leakage current due to lack of heat conductivity near the central part of the condenser.

6. An electrolytic condenser unit including anode and cathode elements having interposed electrolyte medium and di-electric film, the cathode area near the central part of the condenser being perforated to materially reduce the effective area thereof, the effective area of the cathode progressively increasing by a lesser area of perforation per unit area of cathode in the intermediate region of the condenser.

7. An electrolytic condenser including anode and cathode plates rolled together with an electrolyte between them, said anode plate having a di-electric film thereon, said cathode plate presenting an effective area of decreasing electrical conductivity toward the center of the roll.

8. An electrolytic condenser including anode and cathode plates rolled together with an electrolyte between them, said anode plate having a di-electric film thereon, said cathode plate presenting increasingly less effective electrical conductive surface per square unit of area toward the center of the roll.

9. An electrolytic condenser including anode and cathode plates rolled together with an electrolyte between them, said anode plate having a di-electric film thereon, said cathode plate being perforated adjacent its inner end and imperforate adjacent its outer end.

10. An electrolytic condenser including anode and cathode plates rolled together with an electrolyte between them, said anode plate having a di-electric film thereon, said cathode being perforated adjacent its inner end to minimize leakage currents and consequent overheating adjacent the center of the roll.

11. An electrolytic condenser including anode and cathode plates rolled together with an electrolyte between them, said anode plate having a di-electric film thereon, said cathode plate tapering from its outer to its inner end.

12. An electrolytic condenser including anode and cathode plates rolled together with an electrolyte between them, said anode plate having a di-electric film thereon, said cathode plate being perforated at the unexposed region of the condenser where overheating of the condenser might be developed by leakage currents.

13. An electrolytic condenser including anode and cathode plates rolled together with an electrolyte between them, said anode plate having a di-electric film thereon, the cathode plate providing means to prevent overheating near the center of the roll.

14. An electrolytic condenser including anode and cathode plates rolled together with an electrolyte between them, said anode plate having a di-electric film thereon, the electrolytic medium being of increased thickness adjacent the center of the roll to afford greater resistance to leakage currents which tend to generate heat.

ALEXANDER GEORGIEV.